US009455655B2

(12) United States Patent
Myoen et al.

(10) Patent No.: US 9,455,655 B2
(45) Date of Patent: Sep. 27, 2016

(54) MOTOR CONTROL SYSTEM (71) Applicant: Hitachi Automotive Systems, Ltd., Hitachinaka-shi, Ibaraki (JP)

(72) Inventors: Kohei Myoen, Hitachinaka (JP); Atsushi Komuro, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/764,108

(22) PCT Filed: Dec. 18, 2013

(86) PCT No.: PCT/JP2013/083812
§ 371 (c)(1),
(2) Date: Jul. 28, 2015

(87) PCT Pub. No.: WO2014/115446
PCT Pub. Date: Jul. 31, 2014

(65) Prior Publication Data
US 2015/0365024 A1  Dec. 17, 2015

(30) Foreign Application Priority Data

Jan. 28, 2013  (JP) ................................ 2013-013526

(51) Int. Cl.
*H02P 6/08* (2016.01)
*H02P 6/00* (2016.01)
(Continued)

(52) U.S. Cl.
CPC ............... *H02P 6/08* (2013.01); *B60R 16/023* (2013.01); *H02P 6/28* (2016.02); *H02P 29/027* (2013.01)

(58) Field of Classification Search
CPC .......... H02P 6/08; H02P 6/00; H02P 29/027; B60R 16/023

USPC ........................................................ 701/36
See application file for complete search history.

(56) References Cited

U.S. PATENT DOCUMENTS

2009/0021207 A1  1/2009 Kezobo et al.
2011/0309779 A1  12/2011 Hiti et al.
(Continued)

FOREIGN PATENT DOCUMENTS

JP         3204968 B2   9/2001
JP      2004-312931 A  11/2004
(Continued)

OTHER PUBLICATIONS

International Search Report (PCT/ISA/210) dated Mar. 4, 2014 with English translation (four pages).
(Continued)

*Primary Examiner* — Brian P Sweeney
(74) *Attorney, Agent, or Firm* — Crowell & Moring LLP (57) ABSTRACT

A motor control system can suppress production costs, suppress the occurrence of unexpected excessive torque, and continue system operation as much as possible even when the diagnosis results of a monitoring device are abnormal. A computation device computes a voltage command value indicating the voltage to impose on a motor. Based on the voltage command value, the computation device generates a control signal that controls a drive device. When the diagnosis results of the monitoring device are normal, the computation device computes the voltage command value so that the absolute value of the detection value of current flowing to the motor is no greater than a second threshold, and when the diagnosis results of the monitoring device are abnormal, the computation device computes the voltage command value so that this absolute value is no greater than a third threshold that is smaller than the second threshold.

9 Claims, 6 Drawing Sheets (51) Int. Cl.
  *B60R 16/023* (2006.01)
  *H02P 29/02* (2016.01)

(56) References Cited

U.S. PATENT DOCUMENTS

2011/0315470 A1   12/2011   Uryu
2014/0340007 A1*  11/2014   Suhama ............. H02P 21/0021
                                                       318/400.02

FOREIGN PATENT DOCUMENTS

| JP | 4182700 B2 | 11/2008 |
| JP | 2009-171726 A | 7/2009 |
| JP | 2009-207317 A | 9/2009 |
| JP | 2012-25374 A | 2/2012 |
| WO | WO 2007/129359 A1 | 11/2007 |

OTHER PUBLICATIONS

Japanese-Language Office Action issued in counterpart Japanese Application No. 2013-013526 dated Jun. 28, 2016 with English translation (9 pages).

* cited by examiner

MOTOR CONTROL SYSTEM

TECHNICAL FIELD

The present invention relates to a motor control system which controls driving of a motor, and particularly relates to a motor control system which is suitable for controlling a drive motor of a vehicle.

BACKGROUND ART

In a system which controls a current of a motor by causing an inverter to invert an output from a DC power source to an AC voltage and applying the AC voltage to the motor, a necessary voltage command value is calculated by using a computation device such as a microcomputer. The voltage command value from the microcomputer is generally sent to a circuit which controls switching of semiconductor elements such as insulated gate bipolar transistors (IGBT) which are disposed between the DC power source and the motor, as a PWM signal, and thus, a voltage corresponding to the voltage command value is applied to the motor.

A current to be flowing in the motor is determined as a current command value based on the torque to be output from the motor, and the torque to be output is determined as a torque command value by the microcomputer or an external device.

The microcomputer has a plurality of functions such as a function which is necessary when performing computation of the current command value, acquisition of a current value, computation of the voltage command value in order to cause the current of the motor to coincide with the current command value, and outputting of the PWM signal. If any function among thereof becomes abnormal, an abnormality occurs in the function related to controlling of a current. When an abnormality occurs, an unexpected voltage command is applied to the motor and the motor outputs unexpected excessive torque depending on the circumstances, thereby causing a possibility that a negative influence is applied to the outside. Therefore, there is a need to detect the occurrence of an abnormality and to stop applying the voltage to the motor so as to prevent an output of unexpected excessive torque.

For example, in a case where the motor is a drive motor of a vehicle, an abnormality occurs in the computation device. Therefore, there is a need to prevent the motor from outputting torque having a torque command value different from a value sent to the microcomputer from the external device which controls the vehicle system. Particularly, there is a need to prevent excessive torque which is output by the motor and is not expected by a driver.

As a technology for detecting an abnormality of the microcomputer, there are known examples such as an example in which the microcomputer diagnoses abnormality of itself (hereinafter, referred to as a self-diagnosis) and an example in which an abnormality of the microcomputer is diagnosed by a monitoring device other than the microcomputer. Particularly, an objective of the diagnosis made by the monitoring device is to detect an abnormality of the microcomputer even when the microcomputer becomes abnormal and a normal self-diagnosis cannot be made by the microcomputer.

When a result of the self-diagnosis made by the microcomputer indicates abnormality, it is clear that some type of abnormality has occurred in the microcomputer. Therefore, there is a need to stop applying a voltage to the motor. Meanwhile, when a diagnostic result obtained by the monitoring device indicates abnormality, there are a case where the microcomputer is actually abnormal and a case where some type of abnormality has occurred in the monitoring device or in the peripheral circuit thereof.

In the example in which an abnormality of the microcomputer is diagnosed by the monitoring device, if the microcomputer is normal, a current can be continuously controlled by the microcomputer even when an abnormality has occurred in the monitoring device or in the peripheral circuit thereof.

For example, it is possible to consider a case of utilizing a known technique in which the monitoring device receives a signal sent from the microcomputer and the monitoring device executes a diagnosis for the microcomputer. In this example, even though the microcomputer on a side transmitting a signal is normal, if the receiving performance of the monitoring device is abnormal or an abnormality occurs in the circuit used for communication, the diagnostic result obtained by the monitoring device indicates abnormality, as a result.

In this case, when the diagnostic result obtained by the monitoring device indicates abnormality, it is difficult to judge whether the microcomputer is abnormal, or the monitoring device or a portion other than thereof is abnormal. Therefore, according to the example in the related art, the voltage has been stopped from being applied to the motor in order to prevent the possibility of an occurrence of unexpected excessive torque.

In this regard, there is a known technology in which after a sub CPU detects an abnormality of a main CPU, the sub CPU stops the operation of an actuator system by blocking power supplied to the main CPU (for example, refer to PTL 1).

Meanwhile, there is another known technology in which a plurality of the CPUs (three or more CPUs) are caused to monitor each other and the CPU having an abnormality is specified so as to cause the remaining CPU with no abnormality to continue the computation (for example, refer to PTL 2).

CITATION LIST

Patent Literature

PTL 1: Japanese Patent No. 4182700
PTL 2: Japanese Patent No. 3204968

SUMMARY OF INVENTION

Technical Problem

According to the technology disclosed in PTL 1, it is not possible to determine which one of a main CPU and a sub CPU is abnormal when the sub CPU detects an abnormality. In a case where the main CPU is normal and computation can be performed, there is a possibility that an operation of an actuator system can continue. However, according to the technology disclosed in PTL 1, after the sub CPU detects an abnormality of the main CPU, the sub CPU stops the operation of the actuator system by blocking the power supplied to the main CPU. Therefore, it is necessary to continue the operation of the system for as long as possible even when a diagnostic result indicates abnormality.

Meanwhile, in a drive motor of a vehicle, as outputs of the motor stop and the vehicle cannot continue to travel, a time period may be required before an abnormality site is set for repair. In other words, it is necessary to continue the operation of the system for as long as possible. In addition, it is also necessary to prevent unexpected excessive torque from being generated. However, in this case, there is no need to drive the vehicle at a high speed, and it is acceptable even at a low speed, as long as there is at least an output of torque to the extent that the vehicle can move. In other words, it is acceptable as long as driving can continue in a state where the magnitude of the torque is limited.

According to the technology disclosed in PTL 2, interactive processing among a plurality of CPUs becomes complicated and the number of the CPUs increases, thereby resulting in an increase of the probability of an abnormality occurring in the system. Thus, there is a concern that the possibility of the continuous driving of a vehicle is deteriorated. In addition, it is assumed that costs increase since the plurality of CPUs exhibiting the same performance are used. Therefore, it is required that the operation of the system continues and production costs are reduced.

An objective of the present invention is to provide a motor control system in which even when a diagnostic result obtained by a monitoring device indicates abnormality, an operation of a system can continue for as long as possible, unexpected excessive torque can be prevented from being generated, and production costs can be reduced.

Solution to Problem

In order to achieve the objective described above, the present invention includes an overcurrent detection circuit having a function of turning off a switch when an absolute value of a detection value of a current flowing in a motor exceeds a first threshold value. A computation device computes a voltage command value so as to cause the absolute value of the detection value of a current flowing in the motor to be equal to or smaller than the second threshold value when a diagnostic result obtained by a monitoring device indicates normality, and computes the voltage command value so as to cause the absolute value of the detection value of a current flowing in the motor to be equal to or smaller than a third threshold value which is smaller than the second threshold value when the diagnostic result obtained by the monitoring device indicates abnormality.

Advantageous Effects of Invention

According to the present invention, even when a diagnostic result obtained by a monitoring device indicates abnormality, operation of a system can continue for as long as possible, unexpected excessive torque can be prevented from being generated, and production costs can be reduced. Problems, constitutions, and effects other than those described above will be clearly described through the following embodiments.

DESCRIPTION OF EMBODIMENTS

First Embodiment

Hereinafter, a constitution and an operation of a motor control system 100A according to a first embodiment of the present invention will be described with reference to FIGS. 1 to 3. In the example below, descriptions are given regarding the motor control system 100A for controlling an AC motor of a drive system which is used in a hybrid vehicle, an electric vehicle, and the like.

First, an overall constitution of the motor control system 100A will be described with reference to FIG. 1. FIG. 1 is a constitutional diagram of the motor control system 100A according to the first embodiment of the present invention.

The motor control system 100A includes a DC power source 1, an AC motor 2, a computation device 3, a current sensor 4, an IGBT drive device 5, a monitoring device 6, an overcurrent detection circuit 7A, a voltage apply/stop switch 8, and a magnetic pole position detection sensor 9.

The DC power source 1 is a secondary battery such as a nickel-hydrogen battery and a lithium-ion battery, having a voltage of several hundred volts.

The AC motor 2 is mainly constituted of two components such as a stator including as many winding wires for three phases and, and a rotor in which a permanent magnet is disposed. The magnitude of the torque generated by the AC motor 2 is determined depending on the magnitude of a current flowing in the winding wires, the magnitude of the permanent magnet, and the phase difference therebetween. The relationship between the magnitude of the current and the magnitude of the torque is not proportional. However, when the absolute amount of the current is limited, the absolute amount of the torque is also limited.

An output shaft of the AC motor 2 is connected to an axle. The magnetic pole position detection sensor 9 for detecting a magnetic pole position of the rotor which varies due to a rotation of the rotor is disposed in the AC motor 2.

The computation device 3 is constituted of a microcomputer or the like and computes a voltage command value for controlling three-phase currents (Iu, Iv, and Iw) supplied to the AC motor 2, based on a current command value.

Specifically, the computation device 3 computes a q-shaft current command value Iq* and a d-shaft current command value Id* which are amounts of DC currents, based on a torque command value τ* given from an external device 10. The computation device 3 converts the detection values (Iu, Iv, and Iw) of a current detected by the current sensor 4 into a torque current detection value Iτ and a field current detection value If which are amounts of DC currents, in accordance with a value θ of the magnetic pole position detection sensor 9. The computation device 3 computes a command value of a voltage applied to the AC motor 2 so as to cause the current deviation between the command values (Iq* and Id*) and the detection values (Iq and Id) of the q-shaft current and the d-shaft current to be zero. The voltage command value is transmitted to the IGBT drive device 5 as a pulse width modulation (PWM) signal $S_{pwm}$.

The current sensor 4 detects the current flowing in the AC motor 2 and transmits the detection values (Iu, Iv, and Iw) to the computation device 3 and the overcurrent detection circuit 7A.

The IGBT drive device 5 is constituted of an insulated gate bipolar transistor (IGBT) or the like and applies a voltage to the AC motor 2 from the DC power source 1 as a power source based on the PWM signal $S_{pwm}$ which corresponds to a voltage command from the computation device 3.

Specifically, in the IGBT drive device 5 (a switching circuit), IGBTs (switching elements) performing switching at a high speed are disposed on the cathode side and the anode side of the DC power source 1 for three phases on each side making six in total (from Tr1 to Tr6). As the IGBT is switched based on the PWM signal $S_{pwm}$ sent from the computation device 3, a voltage corresponding to the voltage command value is applied to the AC motor 2.

The monitoring device 6 monitors the presence and the absence of an abnormality of the computation device 3.

Specifically, the monitoring device 6 includes a function of making a diagnosis for the computation device 3. The monitoring device 6 receives a pulse signal pls which is transmitted from the computation device 3 in a certain cycle. The monitoring device 6 makes a diagnosis of whether or not the pulse width and the cycle of the received pulse signal pls are included within a range of normality. When not being within the range of normality range, a diagnostic result indicates abnormality. However, when the monitoring device 6 itself is abnormal, even though the computation device 3 is normal, the computation device 3 may be diagnosed as having an abnormality.

When the diagnostic result indicates abnormality, the monitoring device 6 transmits a diagnostic result $R_d$ to the computation device 3 and outputs a signal $S_e$ (an enable signal) for enabling a function of outputting a voltage apply/stop signal of the overcurrent detection circuit 7A after a time period set in advance has elapsed. When the computation device 3 changes the current command value, the set time period needs to be lengthened more than the time taken for the above-described current deviation to become substantially zero. For example, when the time taken for the current deviation to become substantially zero after the current command value has changed is 5 ms, the time is set to 10 ms which is twice thereof, or the like.

The monitoring device 6 transmits the diagnostic result $R_d$ thereof to the computation device 3 when the diagnostic result indicates normality.

The monitoring device 6 is constituted of a low performance microcomputer or the like. Since the monitoring device 6 does not require the complicated function of the computation device 3 for controlling a current, it is possible to use the monitoring device 6 which is inexpensive. However, the monitoring device 6 needs to have a function of receiving a pulse from the computation device 3 and executing diagnosis processing. Therefore, there is a possibility that an abnormality occurs in the monitoring device 6 while receiving the pulse or executing diagnosis processing.

The overcurrent detection circuit 7A is constituted of a comparator, a memory, and the like and outputs a voltage apply/stop signal $S_{stop}$ when the current of the AC motor 2 exceeds the range of a set threshold value.

Specifically, the overcurrent detection circuit 7A has a function of outputting the voltage apply/stop signal $S_{stop}$ to the voltage apply/stop switch 8 when an overcurrent is detected if the current flowing in the AC motor 2 exceeds the range of the current threshold value set in advance. Enablement and disenablement are controlled through this function in accordance with the signal $S_e$ from the monitoring device 6. In other words, the voltage apply/stop signal $S_{stop}$ can be output in a case of enablement, but outputting of the voltage apply/stop signal $S_{stop}$ is not executed in a case of disenablement.

Even when there is a possibility that the computation device 3 is abnormal, it is desirable that the current threshold value is determined based on the magnitude of the torque allowed for the AC motor 2. For example, the current threshold value is set to be equal to or smaller than a value corresponding to the magnitude of the torque at which a driver can stop by using a brake even when the computation device 3 is abnormal so as to not generate unexpected torque.

However, it needs to be ensured that the current threshold value is equal to or greater than a value corresponding to the magnitude of the torque at which the vehicle can be driven at a low speed when the computation device 3 is normal. In addition, it may be considered that an overcurrent is detected when a state where a current flowing in the AC motor 2 exceeds the range of the current threshold value set in advance continues for a time period set in advance. It is desirable that the set time period is determined so as to prevent erroneous detection of the overcurrent caused by noise and the like being superimposed on the current detection value.

The voltage apply/stop switch 8 blocks the PWM signal from the computation device 3 in response to the voltage apply/stop signal $S_{stop}$ so as to stop applying a voltage to the AC motor 2 performed by the IGBT drive device 5. In other words, the voltage apply/stop switch 8 turns on and off to supply a control signal for controlling the IGBT drive device 5 from the computation device 3 to the IGBT drive device 5.

Specifically, the voltage apply/stop switch 8 for stopping the PWM signal $S_{pwm}$ is connected in series and is disposed on the transmission channel of the PWM signal $S_{pwm}$ between the computation device 3 and the IGBT drive device 5. When the switch is activated (open), the IGBTs (Tr1 to Tr6) stop being switched, and a voltage stops being applied to the AC motor 2.

The magnetic pole position detection sensor 9 detects the magnetic pole position of the rotor and transmits the detection value θ to the computation device 3.

The external device 10 gives the computation device 3 the torque command value τ* to be output by the AC motor. The external device 10 acquires various items of information from the computation device 3.

Subsequently, an operation of the motor control system 100A according to the first embodiment of the present invention will be described with reference to FIG. 2. FIG. 2 is a diagram for illustrating the operation of the motor control system 100A according to the first embodiment of the present invention when an abnormality occurs in the computation device 3.

Hereinafter, an example will be described regarding a case where an abnormality occurs in the computation device 3 at timing T1 while the motor is controlled according to the current command value which is computed based on a torque command from the external device 10 after the system has started.

Figure 2A:
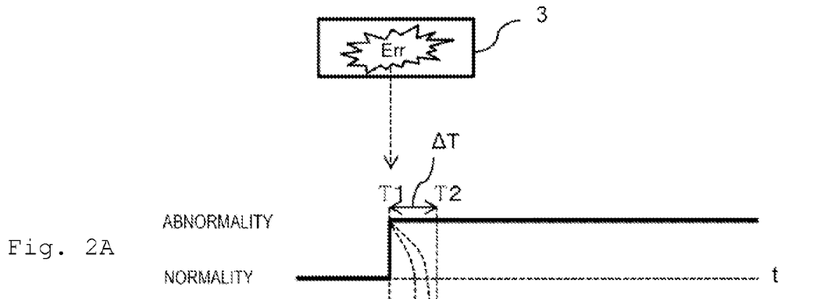
FIGS. 2A-2C are diagrams for illustrating an operation of the motor control system according to the first embodiment of the present invention in a case where an abnormality occurs in a computation device.

FIG. 2(A) is a diagram for illustrating a diagnostic result obtained by the monitoring device 6. The horizontal axis represents a time t, and the vertical axis represents the diagnostic result (abnormality/normality). In this example, the diagnostic result of the monitoring device 6 indicates normality before the timing T1, and the diagnostic result of the monitoring device 6 indicates abnormality after the timing T1.

Figure 2B:
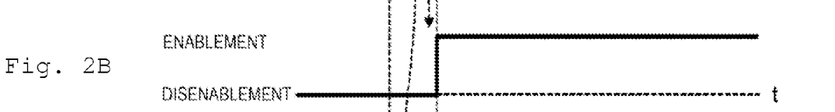

FIG. 2(B) is a diagram for illustrating an operational state of the function of the voltage apply/stop signal of the overcurrent detection circuit 7A. The horizontal axis represents the time t, and the vertical axis represents the operational state (enablement/disenablement) of the functioning of the voltage apply/stop signal. Timing T2 is a timing after a predetermined time ΔT set in advance elapsed since the timing T1 when the abnormality has occurred. In this example, the function of outputting the voltage apply/stop signal of the overcurrent detection circuit 7A is disenabled before the timing T2, and the function of outputting the voltage apply/stop signal of the overcurrent detection circuit 7A is enabled after the timing T2.

Figure 2C:
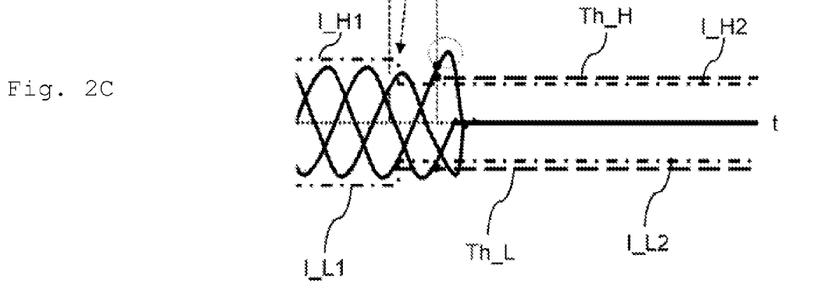

FIG. 2(C) is a diagram showing the detection value of the three-phase current of the AC motor 2 obtained by the current sensor 4. The horizontal axis represents the time t, and the vertical axis represents the detection values (Iu, Iv, and Iw) of the detected currents. In this example, the computation device 3 performs an ordinary operation before the timing T1. The upper limit and the lower limit of a controlled current range of the ordinary operation are I_H1 and I_L1 respectively. In the present embodiment, I_H1 and I_L1 have the same absolute value.

Meanwhile, after the timing T1, the computation device 3 performs limited driving. The upper limit and the lower limit of the controlled current range of the limited driving are I_H2 and I_L2 respectively. In the present embodiment, I_H2 and I_L2 have the same absolute value.

During the limited driving, compared to the ordinary operation, the absolute value of the upper limit and lower limit values in the controlled current range becomes small. That is, the controlled current range during the limited driving is included in the controlled current range during the ordinary operation.

In other words, when the diagnostic result obtained by the monitoring device 6 indicates normality, the computation device 3 computes the voltage command value so as to cause the absolute value of the detection value of a current flowing in the motor 2 to be equal to or smaller than the threshold value (the absolute value of I_H1 and I_L1). Meanwhile, when the diagnostic result obtained by the monitoring device 6 indicates abnormality, the computation device 3 computes the voltage command value so as to cause the absolute value of the detection value of a current flowing in the motor 2 to be equal to or smaller than the threshold value (the absolute value of I_H2 and I_L2) which are smaller than the threshold value (the absolute value of I_H1 and I_L1). In this manner, output torque of the AC motor 2 is limited.

In addition, in FIG. 2(C), the upper limit of the range of the current threshold value stored in the memory of the overcurrent detection circuit 7A is represented by a dotted line Th_H, and the lower limit of the range of the current threshold value is represented by a dotted line Th_L. In this case, the relationships of I_H2<Th_H, and Th_L<I_L2 are achieved. The upper limit Th_H and the lower limit Th_L of the current threshold value are determined in consideration of a fluctuation of the detection value obtained by the current sensor 4 and the like. In the present embodiment, Th_H and Th_L have the same absolute value. Here, in FIG. 2(C), a relationship of I_H2 (third threshold value)<Th_H (first threshold value)<I_H1 (second threshold value) is established.

Subsequently, an operation of the motor control system 100A will be described in detail with reference to FIGS. 2(A) to 2(C).

As illustrated in FIG. 2(C), before the timing T1, the three-phase current of the AC motor 2 is included within the controlled current range which is determined based on the current command value.

Figure 1:
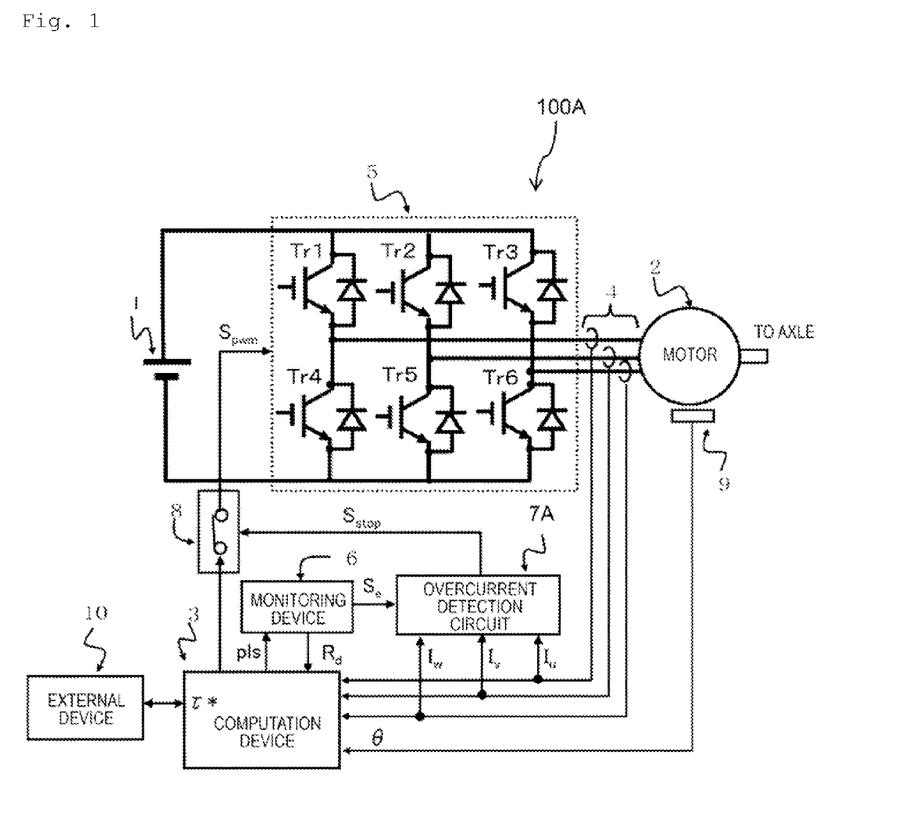
FIG. 1 is a constitutional diagram of a motor control system according to a first embodiment of the present invention.

When an abnormality occurs in the computation device 3 at the timing T1 and "the diagnostic result obtained by the monitoring device 6" indicates abnormality, the monitoring device 6 transmits the diagnostic result $R_d$ to the computation device 3 as illustrated in FIG. 1. Upon the reception thereof, the computation device 3 starts the limited driving in a state where the current command value is set so as to cause "the three-phase current of the AC motor 2" to be within the range (Th_L<I<Th_H) of the current threshold value which is set in the overcurrent detection circuit 7A.

Specifically, in consideration of an error of the above-described current deviation which occurs due to a fluctuation of the detection values of the current sensor 4, the magnetic pole position sensor 9, and the like, the computation device 3 sets the current command value so as to cause "the three-phase current of the AC motor 2", that is, a current I of the AC motor 2, to be within the range (Th_L<I<Th_H) of the current threshold value of the overcurrent detection circuit 7A.

Here, in FIG. 2(C), the upper limit I_H2 of the controlled current range is smaller than the upper limit Th_H of the range of the current threshold value, and the lower limit I_L2 of the controlled current range is greater than the lower limit Th_L of the range of the current threshold value.

Subsequently, at the timing T2 after a time period which is sufficient for the current deviation to be close to zero and has elapsed since the timing T1, the monitoring device 6 outputs the signal $S_e$ for enabling the function of outputting the voltage apply/stop signal to the overcurrent detection circuit 7A. In this manner, the monitoring device 6 enables the function of outputting the voltage apply/stop signal of the overcurrent detection circuit 7A.

In the example of FIG. 2(C), the computation device is in an abnormal state at the timing T1, and "the three-phase current of the motor 2" exceeds the range of the current threshold value of the overcurrent detection circuit 7A at the timing T2. In other words, the absolute value of the detection value of a current flowing in the motor 2 exceeds the threshold value (the absolute value of Th_H and Th_L).

Accordingly, the voltage apply/stop signal $S_{stop}$ is output from the overcurrent detection circuit 7A, and the voltage apply/stop switch 8 is activated so as to stop switching of the IGBT. Therefore, "the three-phase current of the AC motor 2" becomes zero, and the generation torque becomes zero as well.

In this manner, it is possible to prevent unexpected excessive torque from being generated by the AC motor 2 when the computation device 3 is abnormal.

Subsequently, another operation of the motor control system 100A according to the first embodiment of the present invention will be described with reference to FIG. 3. FIG. 3 is a diagram for illustrating the operation of the motor control system 100A according to the first embodiment of the present invention when an abnormality occurs in the monitoring device 6. In FIG. 3, the same reference numerals and signs are applied to the same portions as those in FIG. 2.

Hereinafter, an example will be described regarding a case where the computation device 3 is normal while the motor is controlled according to the current command value which is computed based on a torque command from the external device 10 after the system has started, but the monitoring device 6 is abnormal, thereby causing the diagnostic result obtained by the monitoring device 6 to indicate abnormality.

Figure 3A:
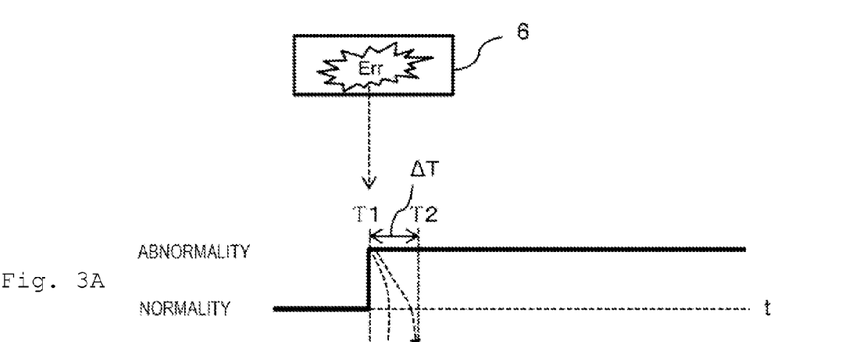
FIGS. 3A-3C are diagrams for illustrating another operation of the motor control system according to the first embodiment of the present invention in a case where an abnormality occurs in the computation device.

FIG. 3(A) is a diagram for illustrating another diagnostic result obtained by the monitoring device 6. The horizontal axis represents the time t, and the vertical axis represents the diagnostic result (abnormality/normality). In this example, the diagnostic result of the monitoring device 6 indicates normality before the timing T1, and the diagnostic result of the monitoring device 6 indicates abnormality after the timing T1.

Figure 3B:
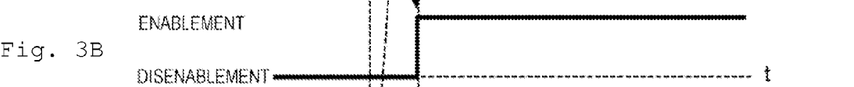

FIG. 3(B) is a diagram for illustrating another operational state of the function of the voltage apply/stop signal of the overcurrent detection circuit 7A. The horizontal axis represents the time t, and the vertical axis represents the operational state (enablement/disenablement) of the function of the voltage apply/stop signal. In this example, the function of outputting the voltage apply/stop signal of the overcurrent detection circuit 7A is disenabled before the timing T2, and the function of outputting the voltage apply/stop signal of the overcurrent detection circuit 7A is enabled after the timing T2.

Figure 3C:
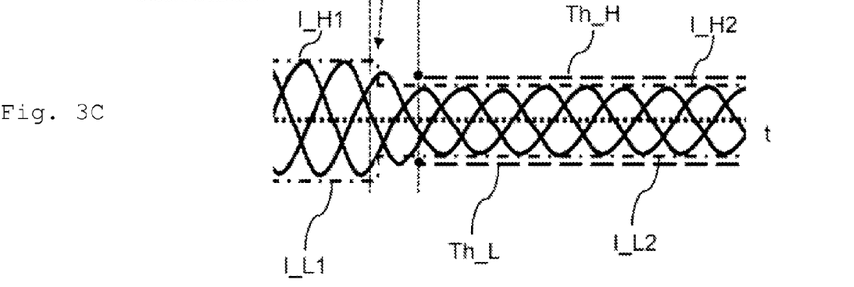

FIG. 3(C) is a diagram showing another detection value of the three-phase current of the AC motor 2 obtained by the current sensor 4. The horizontal axis represents the time t, and the vertical axis represents the detection values (Iu, Iv, and Iw) of the detected currents.

Subsequently, another operation of the motor control system 100A will be described in detail with reference to FIGS. 3(A) to 3(C).

The constitution is the same as that in FIG. 2 to the part of the timing T1, thereby omitting the descriptions thereof. In succession thereto, when an abnormality occurs in the monitoring device 6 at the timing T1 and "the diagnostic result obtained by the monitoring device 6" indicates abnormality, the monitoring device 6 transmits the diagnostic result $R_d$ to the computation device 3 as illustrated in FIG. 1. Upon the reception thereof, the computation device 3 starts limited driving in a state where the current command value is set so as to cause "the three-phase current of the motor 2" to be within the range (Th_L<I<Th_H) of the current threshold value which is set in the overcurrent detection circuit 7A. In this case, the setting of the current command value is performed in the same manner as that in FIG. 2.

Subsequently, at the timing T2 after a time period which is sufficient for the current deviation to be zero and has elapsed since the timing T1, the monitoring device outputs the signal $S_e$ for enabling the function of outputting the voltage apply/stop signal to the overcurrent detection circuit 7A. In this manner, the monitoring device 6 enables the function of outputting the voltage apply/stop signal of the overcurrent detection circuit 7A.

In the example of FIG. 3(C), the monitoring device 6 is in an abnormal state at the timing T1, but the computation device 3 is normal. Therefore, "the three-phase current of the motor 2" does not exceed the range of the current threshold value of the overcurrent detection circuit 7A. Accordingly, the voltage apply/stop signal $S_{stop}$ is not output from the overcurrent detection circuit 7A.

As a result, the computation device 3 can continue to perform limited driving.

Subsequently, descriptions will be given regarding phenomena which may occur due to failure forms when an abnormality occurs in the monitoring device 6.

(Failure Form 1)

A failure form 1 represents a case where the function of transmitting the diagnostic result $R_d$ to the computation device 3 is not in a failure state but the function which enables the function of outputting the voltage apply/stop signal of the overcurrent detection circuit 7A is in a failure state. Since the function of transmitting the diagnostic result $R_d$ to the computation device 3 is not in a failure state, the monitoring device 6 can transmit the diagnostic result $R_d$ to the computation device 3. Meanwhile, since the function which enables the function of outputting the voltage apply/stop signal of the overcurrent detection circuit 7A is in a failure state, the monitoring device 6 cannot enable the function of outputting the voltage apply/stop signal of the overcurrent detection circuit 7A.

In this case, the computation device 3 sets the current command value as described above. However, since the computation device 3 is normal, limited driving continues as it is.

(Failure Form 2)

A failure form 2 represents a case where the function of transmitting the diagnostic result $R_d$ to the computation device 3 is in a failure state, but the function which enables the function of outputting the voltage apply/stop signal of the overcurrent detection circuit 7A is not in a failure state. Since the function of transmitting the diagnostic result $R_d$ to the computation device 3 is in a failure state, the monitoring device 6 cannot transmit the diagnostic result $R_d$ to the computation device 3. Meanwhile, since the function which enables the function of outputting the voltage apply/stop signal of the overcurrent detection circuit 7A is not in a failure state, the monitoring device 6 can enable the function of outputting the voltage apply/stop signal of the overcurrent detection circuit 7A.

In this case, the computation device 3 does not change the setting of the current command value. Therefore, depending on the magnitude of the current command value, a current of "the three-phase current of the motor 2" exceeds the range of the current threshold value of the overcurrent detection circuit 7A. Accordingly, the voltage applied to the motor 2 is stopped based on the voltage apply/stop signal from the overcurrent detection circuit 7A, thereby preventing unexpected excessive torque from being generated.

(Failure Form 3)

A failure form 3 represents a case where the function of transmitting the diagnostic result $R_d$ to the computation device 3 is in a failure state and the function which enables the function of outputting the voltage apply/stop signal of the overcurrent detection circuit 7A is in a failure state. Since the function of transmitting the diagnostic result $R_d$ to the computation device 3 is in a failure state, the monitoring device 6 cannot transmit the diagnostic result $R_d$ to the computation device 3. In addition, since the function which enables the function of outputting the voltage apply/stop signal of the overcurrent detection circuit 7A is in a failure state, the monitoring device 6 cannot enable the function of outputting the voltage apply/stop signal of the overcurrent detection circuit 7A.

In this case, the computation device 3 does not change the setting of the current command value, and the function of outputting the voltage apply/stop signal of the overcurrent detection circuit 7A is disenabled. Therefore, it is possible to control the current in the ordinary manner (the ordinary operation).

As described above, according to the present embodiment, even when the diagnostic result obtained by the monitoring device indicates abnormality, it is possible to continue operation of the system for as long as possible and to prevent unexpected excessive torque from being generated. In addition, since a plurality of the high-performance microcomputers are not used, it is possible to reduce production costs of the motor control system.

Second Embodiment

Figure 4:
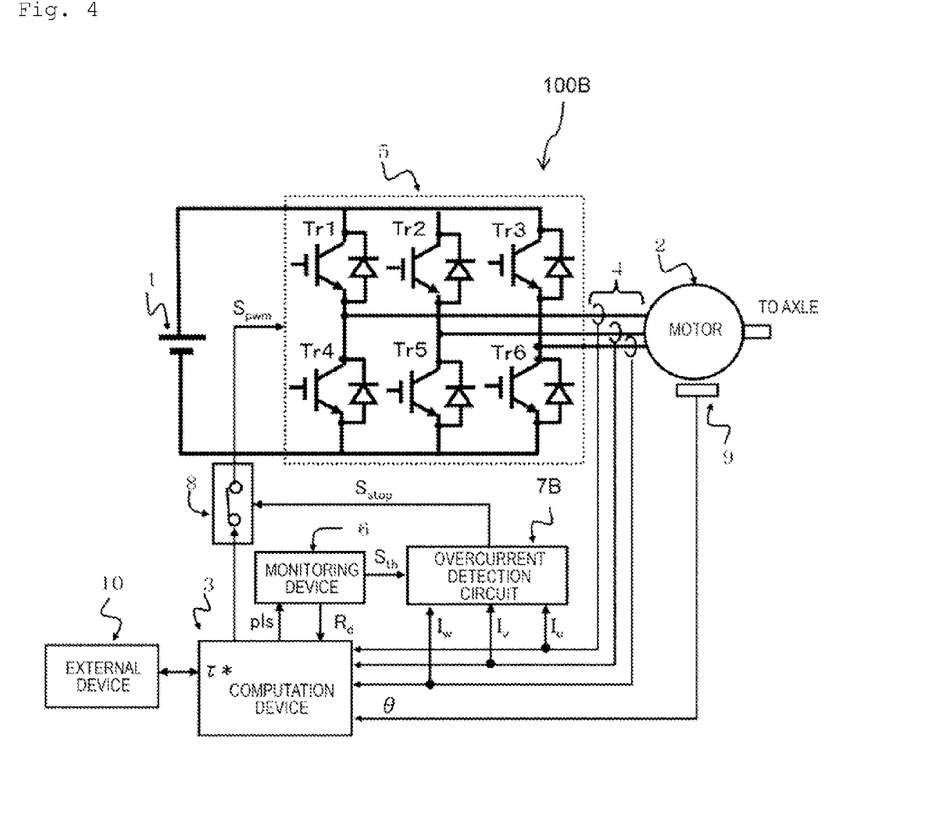
FIG. 4 is a constitutional diagram of the motor control system according to a second embodiment of the present invention.

Hereinafter, a constitution and an operation of a motor control system 100B according to a second embodiment of the present invention will be described with reference to FIGS. 4 to 6. In FIG. 4, the same reference numerals and signs are applied to the same portions as those in FIG. 1.

First, an overall constitution of the motor control system 100B will be described with reference to FIG. 4. FIG. 4 is a constitutional diagram of the motor control system 100B according to the second embodiment of the present invention.

In the motor control system 100B illustrated in FIG. 4, compared to the motor control system 100A illustrated in FIG. 1, an overcurrent detection circuit 7B is used in place of the overcurrent detection circuit 7A.

Similar to the overcurrent detection circuit 7A, the overcurrent detection circuit 7B has a function of outputting the voltage apply/stop signal $S_{stop}$ to the voltage apply/stop switch 8 when an overcurrent is detected if the current flowing in the AC motor 2 exceeds the range of the current threshold value set in advance.

However, the function of outputting the voltage apply/stop signal of the overcurrent detection circuit 7B is enabled at all times. In addition, the overcurrent detection circuit 7B stores a current threshold value 1 and a current threshold value 2 as the current threshold values. The current threshold value 1 is constituted of an upper limit value Th_H1 and a lower limit value Th_L1, and the current threshold value 2 is constituted of an upper limit value Th_H2 and a lower limit value Th_L2. In the present embodiment, Th_H1 and Th_L1 have the same absolute value, and Th_H2 and Th_L2 have the same absolute value.

In this case, the monitoring device 6 of the present embodiment supplies a signal $S_{th}$ for designating the current threshold value to the overcurrent detection circuit 7B in place of the signal $S_e$ for enabling the function of outputting the voltage apply/stop signal. The overcurrent detection circuit 7B changes the current threshold value to the current threshold value 1 or the current threshold value 2 based on the control signal $S_{th}$ output by the monitoring device 6. In the present embodiment, the monitoring device 6 outputs the control signal $S_{th}$ so as to set the current threshold value to the current threshold value 1 when the diagnostic result indicates normality and to set the current threshold value to the current threshold value 2 when the diagnostic result indicates abnormality.

It is desirable that the current threshold value 1 is set to a range not exceeding the current of the motor 2 when the motor is controlled with no abnormality (for example, a range not exceeding the current corresponding to the maximum accelerator operation quantity). Even when there is a possibility that the computation device 3 is abnormal, it is desirable that the current threshold value 2 is determined based on the magnitude of the torque allowed for the motor.

Particularly, in consideration of being applied to a vehicle, the current threshold value 2 is set to be equal to or smaller than a value corresponding to the magnitude of the torque at which a driver can stop by using a brake even when the computation device 3 is abnormal so as to not generate unexpected torque. However, it needs to be ensured that the current threshold value 2 is equal to or greater than a value corresponding to the magnitude of the torque at which the vehicle can be driven at a low speed when the computation device 3 is normal.

In addition, it may be considered that an overcurrent is detected when a state where a current flowing in the AC motor 2 exceeds the range of the current threshold value set in advance continues for a time period set in advance, and it is desirable that the set time period is determined so as to prevent erroneous detection of the overcurrent caused by noise and the like being superimposed on the current detection value.

Subsequently, an operation of the motor control system 100B according to the second embodiment of the present invention will be described with reference to FIG. 5. FIG. 5 is a diagram for illustrating the operation of the motor control system 100B according to the second embodiment of the present invention when an abnormality occurs in the computation device 3. In FIG. 5, the same reference numerals and signs are applied to the same portions as those in FIG. 2.

Hereinafter, an example will be described regarding a case where an abnormality occurs in the computation device 3 at the timing T1 while the motor is controlled according to the current command value which is computed based on a torque command from the external device 10 after the system has started.

Figure 5A:
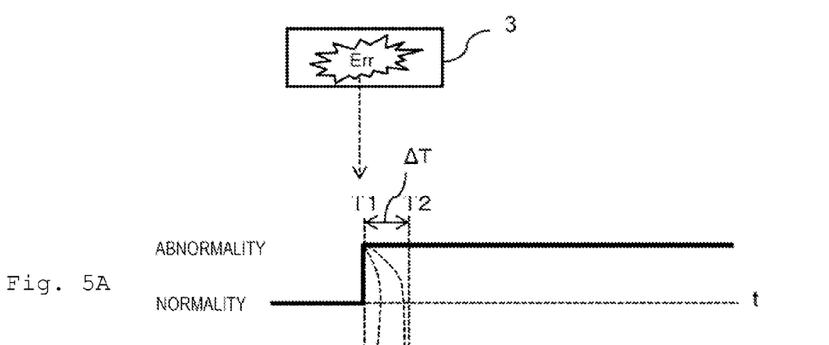
FIGS. 5A and 5B are diagrams for illustrating an operation of the motor control system according to the second embodiment of the present invention in a case where an abnormality occurs in the computation device.

FIG. 5(A) is a diagram for illustrating a diagnostic result obtained by the monitoring device 6. The horizontal axis represents the time t, and the vertical axis represents the diagnostic result (abnormality/normality). In this example, the diagnostic result of the monitoring device 6 indicates normality before the timing T1, and the diagnostic result of the monitoring device 6 indicates abnormality after the timing T1.

Figure 5B:
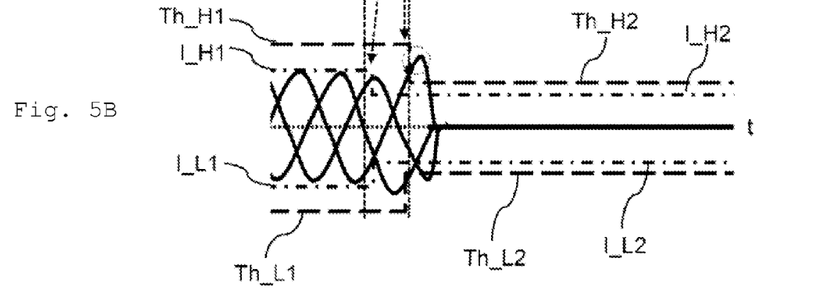

FIG. 5(B) is a diagram showing the detection value of the three-phase current of the AC motor 2 obtained by the current sensor 4. The horizontal axis represents the time t, and the vertical axis represents the detection values (Iu, Iv, and Iw) of the detected currents. In this example, the computation device 3 is normal before the timing T1, and "the diagnostic result obtained by the monitoring device 6" indicates normality. Therefore, before the timing T1, "the three-phase current of the motor 2" is included within the controlled current range (I_L1<I<I_H1) which is determined based on the current command value.

In addition, since the current threshold value of the overcurrent detection circuit 7B is set to the above-described current threshold value 1 (Th_H1 and Th_L1) until the timing T2, there is no chance for the overcurrent detection circuit 7 to detect an overcurrent as long as the current is normally controlled.

Sequentially, when an abnormality occurs in the computation device 3 at the timing T1 and "the diagnostic result obtained by the monitoring device 6" indicates abnormality, the monitoring device 6 transmits the diagnostic result $R_d$ to the computation device 3 as illustrated in FIG. 4. Upon the reception thereof, the computation device 3 starts the limited driving in a state where the current command value is set so as to cause the current of the AC motor 2 to be within the range of the current threshold value 2 (Th_H2 and Th_L2) of the overcurrent detection circuit 7B.

Specifically, in consideration of an error of the above-described current deviation which occurs due to a fluctuation of the detection values of the current sensor 4, the magnetic pole position sensor 9, and the like, the current command value is set so as to cause "the three-phase current of the motor 2", that is, a current of the motor 2 to be within the range (Th_H2 and Th_L2) of the current threshold value 2 of the overcurrent detection circuit 7B.

Here, in FIG. 5(B), the upper limit I_H2 of the controlled current range is smaller than the upper limit Th_H2 of the range of the current threshold value, and the lower limit I_L2 of the controlled current range is greater than the lower limit Th_L2 of the range of the current threshold value. In addition, in FIG. 5(B), relationships of I_H1 (second threshold value)<Th_H1 (first threshold value Th1), and I_H2 (third threshold value)<Th_H2 (first threshold value Th2) <I_H1 (second threshold value) are established.

Subsequently, at the timing T2 after a time period which is sufficient for the current deviation to be zero and has elapsed since the timing T1, the monitoring device 6 changes the current threshold value of the overcurrent detection circuit 7B from the current threshold value 1 (Th_H1 and Th_L1) to the current threshold value 2 (Th_H2 and Th_L2).

In the example of FIG. 5(B), the computation device is in an abnormal state at the timing T1, and "the three-phase current of the motor 2" exceeds the upper limit Th_H2 of the current threshold value 2 of the overcurrent detection circuit 7 at the timing T2. Accordingly, the voltage apply/stop signal $S_{stop}$ is output from the overcurrent detection circuit 7, and the voltage apply/stop switch 8 is activated so as to stop switching of the IGBT. Therefore, "the three-phase current of the AC motor 2" becomes zero, and the generation torque becomes zero as well.

In this manner, it is possible to prevent unexpected excessive torque from being generated by the AC motor 2 when the computation device 3 is abnormal.

Subsequently, another operation of the motor control system 100B according to the second embodiment of the present invention will be described with reference to FIG. 6. FIG. 6 is a diagram for illustrating the operation of the motor control system 100B according to the second embodiment of the present invention when an abnormality occurs in the monitoring device 6. In FIG. 6, the same reference numerals and signs are applied to the same portions as those in FIG. 5.

Hereinafter, an example will be described regarding a case where the computation device 3 is normal while the motor is controlled according to the current command value which is computed based on a torque command from the external device 10 after the system has started, but the monitoring device 6 is abnormal, thereby causing the diagnostic result obtained by the monitoring device 6 to indicate abnormality.

Figure 6A:
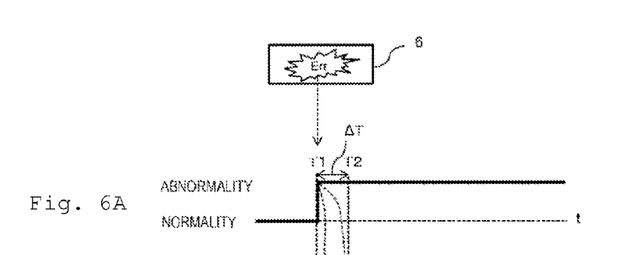
FIGS. 6A and 6B are diagrams for illustrating another operation of the motor control system according to the second embodiment of the present invention in a case where an abnormality occurs in the computation device.

FIG. 6(A) is a diagram for illustrating another diagnostic result obtained by the monitoring device 6. The horizontal axis represents the time t, and the vertical axis represents the diagnostic result (abnormality/normality). In this example, the diagnostic result of the monitoring device 6 indicates normality before the timing T1, and the diagnostic result of the monitoring device 6 indicates abnormality after the timing T1.

Figure 6B:
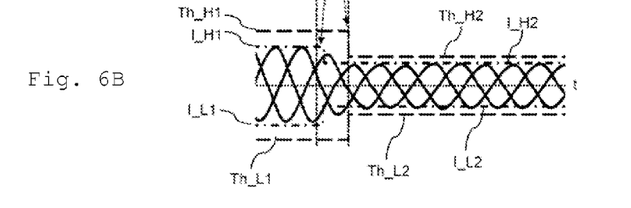

FIG. 6(B) is a diagram showing another detection value of the three-phase current of the AC motor 2 obtained by the current sensor 4. The horizontal axis represents the time t, and the vertical axis represents the detection values (Iu, Iv, and Iw) of the detected currents.

The constitution is the same as that in FIG. 5 to the part of the timing T1, thereby omitting the descriptions thereof. In succession thereto, when an abnormality occurs in the computation device 3 at the timing T1 and "the diagnostic result obtained by the monitoring device 6" indicates abnormality, the monitoring device 6 transmits the diagnostic result $R_d$ to the computation device 3 as illustrated in FIG. 4. Upon the reception thereof, the computation device 3 starts the limited driving in a state where the current command value is set so as to cause a current of the AC motor 2 to be within the range of the current threshold value 2 (Th_H2 and Th_L2) of the overcurrent detection circuit 7B. In this case, the setting of the current command value is performed in the same manner as that in FIG. 5.

Subsequently, at the timing T2 after a time period which is sufficient for the current deviation to be zero and has elapsed since the timing T1, the monitoring device supplies the signal $S_{th}$ for designating the current threshold value 2 to the overcurrent detection circuit 7B. In this manner, the monitoring device 6 changes the current threshold value of the overcurrent detection circuit 7 from the current threshold value 1 (Th_H1 and Th_L1) to the current threshold value 2 (Th_H2 and Th_L2).

In other words, the monitoring device 6 sets the absolute value of the current threshold value of the overcurrent detection circuit 7 to Th1 when the diagnostic result indicates normality and changes the absolute value of the current threshold value of the overcurrent detection circuit 7 from Th1 to Th2 which is smaller than Th1 when the diagnostic result indicates abnormality. In this case, Th1 is the absolute value of Th_H1 and Th_L1, and Th2 is the absolute value of Th_H2 and Th_L2.

The computation device 3 is normal, and there is no chance for "the three-phase current of the motor 2" to exceed the range of the current threshold value 2 (Th_H2 and Th_L2) of the overcurrent detection circuit 7, thereby being able to continue to perform the limited driving.

The phenomena which may occur due to the failure forms when an abnormality occurs in the monitoring device 6 are similar to those in the first embodiment, thereby omitting the descriptions thereof.

Third Embodiment

Figure 7:
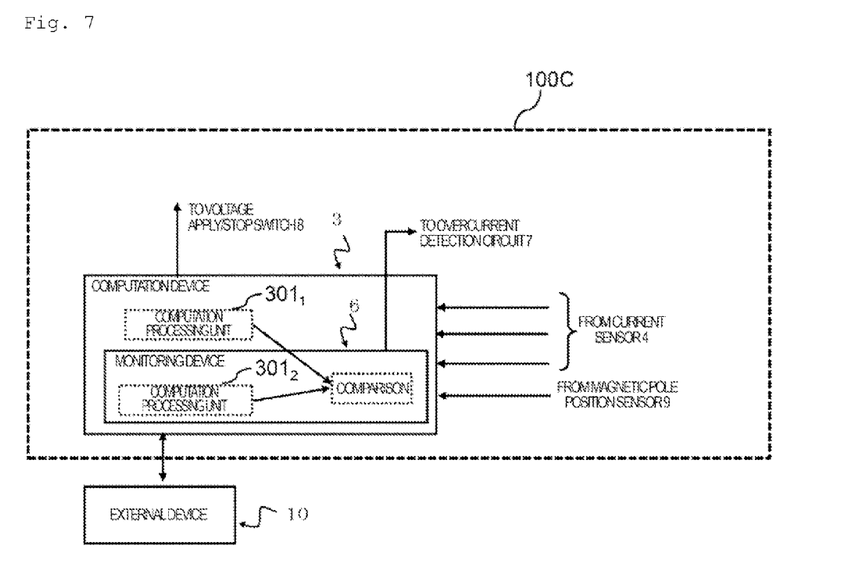
FIG. 7 is a constitutional diagram of the computation device which is used in the motor control system according to a third embodiment of the present invention.

Hereinafter, a constitution of the computation device 3 which is used in a motor control system 100C according to a third embodiment of the present invention will be described with reference to FIG. 7. FIG. 7 is a constitutional diagram of the computation device 3 which is used in the motor control system 100C according to the third embodiment of the present invention. In FIG. 7, the same reference numerals and signs are applied to the same portions as those in FIG. 1.

The computation device 3 includes a computation processing unit $301_1$ which executes computation processing for controlling a current. In the present embodiment, the monitoring device 6 is disposed inside the computation device 3. The monitoring device 6 includes a computation processing unit $301_2$ which is completely identical to the computation processing unit $301_1$.

The computation processing units $301_1$ and $301_2$ execute the same computation, and the monitoring device 6 compares the computation results between both thereof so as to make a diagnosis for the computation device 3 based on whether or not there is a difference therebetween.

As described above, according to the present embodiment, there is no need to separately provide the monitoring device 6. Therefore, production costs of the motor control system 100C can be reduced.

In the aforementioned description, a diagnosis of an abnormality in the computation device 3 performed by the monitoring device 6 is executed by the monitoring device 6 based on the pulse signal transmitted from the computation device 3. However, the monitoring device 6 may make a diagnosis for the computation device 3 according to another known technology. For example, the present invention may adopt a method in which the monitoring device 6 sets an example question with respect to the computation device 3 and the computation device 3 transmits a solution thereof to the monitoring device 6, thereby causing the monitoring device 6 to make a diagnosis for the computation device 3 based on whether or not the solution is correct.

In the aforementioned description, when processing of the limited driving is executed, it is desirable to transmit information thereof to the outside. For example, it is desirable that the computation device 3 transmits the state of the limited driving to the external device 10 by lighting a failure display lamp which is provided in a vehicle in order to notify a driver of the state of the limited driving. The transmitting of information is also necessary in order to allow the external device 10 to determine the torque command value which is necessary during the limited driving. In addition, the present invention may adopt a constitution in which the state of the voltage apply/stop signal $S_{stop}$ can be notified to the external device 10. In this case, regardless of the state of the computation device 3, a stop of the PWM can be notified to the external device 10.

In the aforementioned description, a case where the present invention is applied to the three-phase AC synchronous motor with a built-in magnet has been described. However, the present invention can be applied to an induction motor without the built-in magnet or a non-three-phase AC motor. Thus, the present embodiment is not limited thereto.

All the embodiments currently disclosed are examples and are not limited. The technical scope of the present embodiment is defined in accordance with Claims, and all the changes within the range equivalent to the constitution disclosed therein are included in the technical scope of the present embodiment.

REFERENCE SIGNS LIST

1 DC POWER SOURCE
2 AC MOTOR
3 COMPUTATION DEVICE
4 CURRENT SENSOR
5 IGBT DRIVE DEVICE
6 MONITORING DEVICE
7 OVERCURRENT DETECTION CIRCUIT
8 VOLTAGE APPLY/STOP SWITCH
9 MAGNETIC POLE POSITION DETECTION SENSOR
10 EXTERNAL DEVICE
301 COMPUTATION PROCESSING UNIT

The invention claimed is:

1. A motor control system comprising:
a motor;
a drive device that applies a voltage to the motor;
a computation device that computes a voltage command value indicating the voltage applied to the motor and generates a control signal for controlling the drive device based on the voltage command value;
a switch that is connected in series between the computation device and the drive device and turns on and off supplying of the control signal from the computation device to the drive device;
an overcurrent detection circuit that has a function of turning off said switch when an absolute value of a detection value of a current flowing in the motor exceeds a first threshold value; and
a monitoring device that makes a diagnosis for the computation device,
wherein the computation device computes the voltage command value so as to cause the absolute value of the detection value of the current flowing in the motor to be equal to or smaller than a second threshold value when a diagnostic result obtained by the monitoring device indicates normality, and computes the voltage command value so as to cause the absolute value of the detection value of the current flowing in the motor to be equal to or smaller than a third threshold value which is smaller than the second threshold value when the diagnostic result obtained by the monitoring device indicates abnormality.

2. The motor control system according to claim 1, wherein the monitoring device enables a function of the overcurrent detection circuit when the diagnostic result indicates abnormality.

3. The motor control system according to claim 2, wherein the monitoring device enables the function of the overcurrent detection circuit after a predetermined time elapsed since timing when the diagnostic result indicates abnormality.

4. The motor control system according to claim 2, wherein the motor is a drive motor of a vehicle, and wherein the third threshold value is equal to or smaller than a value corresponding to magnitude of torque at which a brake can stop the vehicle and is equal to or greater than a value corresponding to magnitude of torque at which the vehicle can be driven at a low speed.

5. The motor control system according to claim 1, wherein the function of the overcurrent detection circuit is enabled at all times, and wherein the monitoring device sets the first threshold value to a certain value Th1 when the diagnostic result indicates normality and sets the first threshold value to another value Th2 which is smaller than the certain value Th1 when the diagnostic result indicates abnormality.

6. The motor control system according to claim 5, wherein the monitoring device sets the first threshold value to the other value Th2 which is smaller than the certain value Th1 after a predetermined time elapsed since timing when the diagnostic result indicates abnormality.

7. The motor control system according to claim 5, wherein the motor is a drive motor of a vehicle, and wherein the third threshold value is equal to or smaller than a value corresponding to magnitude of torque at which a brake can stop the vehicle and is equal to or greater than a value corresponding to magnitude of torque at which the vehicle can be driven at a low speed.

8. The motor control system according to claim 1, wherein the first threshold value is smaller than the second threshold value and is greater than the third threshold value.

9. The motor control system according to claim 5, wherein the certain value Th1 set as the first threshold value is greater than the second threshold value, and wherein the other value Th2 set as the first threshold value is smaller than the second threshold value and greater than the third threshold value.

\* \* \* \* \*